US006228951B1

(12) United States Patent
Hirota et al.

(10) Patent No.: US 6,228,951 B1
(45) Date of Patent: May 8, 2001

(54) POLYPROPYLENE MOLDING MATERIAL

(75) Inventors: Yoshifumi Hirota; Tadashi Sezume, both of Mie (JP)

(73) Assignee: Japan Polychem Corporation, Tokyo (JP)

( * ) Notice: Subject to any disclaimer, the term of this patent is extended or adjusted under 35 U.S.C. 154(b) by 0 days.

(21) Appl. No.: 09/379,360

(22) Filed: Aug. 23, 1999

(30) Foreign Application Priority Data

Aug. 24, 1998 (JP) .................................... 10-236743

(51) Int. Cl.⁷ .................................. C08F 8/00; C08F 8/50
(52) U.S. Cl. .......................................... 525/333.8; 525/387
(58) Field of Search ............................................ 525/333.8

(56) References Cited

U.S. PATENT DOCUMENTS 5,629,254 * 5/1997 Fukuoka et al. ...................... 526/160
6,153,710 * 11/2000 Saito et al. ............................... 526/75

* cited by examiner

*Primary Examiner*—Bernard Lipman
(74) *Attorney, Agent, or Firm*—Oblon, Spivak, McClelland, Maier & Neustadt, P.C.

(57) ABSTRACT

Disclosed is a polypropylene molding material obtained by the reaction of a crystalline polypropylene resin and a peroxide, said polypropylene molding material having (A) a melt flow rate of 20 to 100 g/10 min and a weight average molecular weight to number average molecular weight ratio of 1.5 to 3.5 as measured by gel-permeation chromatography, (B) a content of hydrocarbons having 20 to 70 carbon atoms of 0.05% by weight or less, (C) a mean elution temperature ($T_{50}$) of 75 to 120° C. and a degree of variation of elution ($\sigma$) of 9 or smaller, and (D) a Q2/Q1 ratio of 0.75 to 0.95, wherein Q1 is a weight average molecular weight to number average molecular weight ratio of said crystalline polypropylene resin as measured by gel-permeation chromatography, and Q2 is a weight average molecular weight to number average molecular weight ratio of said propylene molding material as measured by gel-permeation chromatography.

10 Claims, No Drawings

POLYPROPYLENE MOLDING MATERIAL

FIELD OF THE INVENTION

This invention relates to a polypropylene molding material which emits a reduced amount of fumes on molding and has excellent high-speed spinnability.

BACKGROUND OF THE INVENTION

It is known that polypropylene can be used in melt spinning such as spun bonding. Polypropylene for this use is usually subjected to chemical treatment with a considerable amount of a peroxide in an additive stage following polymerization, which is called a controlled rheology treatment (hereinafter abbreviated as CR treatment). Without the CR treatment, polypropylene is unsuited to high-speed spinning because the spun filament would break even at a low take-up speed.

However, the CR treatment incurs an increase of cost of production, and the reaction between the polymer and the peroxide involves by-production of low-molecular weight fragments and color change of the polymer. In particular, the low-molecular fragments not only cause fuming on spinning, which is unfavorable to the production process, but stick to the molding machine to seriously reduce the productivity.

Polypropylene prepared by polymerization in the presence of a metallocene catalyst is known usable in high-speed spinning the CR treatment with a peroxide. However, polymerization of propylene using a metallocene catalyst tends to be accompanied with production of trace amounts of high-molecular components which also cause filament failure in high-speed spinning.

SUMMARY OF THE INVENTION

An object of the present invention is to provide a polypropylene molding material consisting mainly of a crystalline polypropylene resin which hardly gives off fumes during molding, such as spinning, and exhibits excellent high-speed spinnability.

As a result of extensive investigations, the inventors have found that the object of the invention is accomplished by a polypropylene molding material having specific physical properties which is obtained by allowing a crystalline polypropylene resin having a given composition distribution, such as one obtained by polymerization using a metallocene catalyst, to react with a peroxide. The present invention has been completed based on this finding.

The invention provides a polypropylene molding material which is obtained by the reaction of a crystalline polypropylene resin and a peroxide and has the following physical properties (A) to (D):

(A) A melt flow rate (hereinafter abbreviated as MFR) of 20 to 100 (g/10 min) and a weight average molecular weight to number average molecular weight ratio of 1.5 to 3.5 (hereinafter abbreviated as Mw/Mn) as measured by gel-permeation chromatography (hereinafter abbreviated as GPC).

(B) A content of hydrocarbons having 20 to 70 carbon atoms (hereinafter referred to as a $C_{20-70}$ hydrocarbon content) of 0.05% by weight or less.

(C) A mean elution temperature ($T_{50}$) of 75 to 120° C. and a degree of variation of elution ($\sigma$) of 9 or smaller.

(D) A Q2/Q1 ratio of 0.75 to 0.95, wherein Q1 is an Mw/Mn of the crystalline polypropylene resin as measured by GPC, and Q2 is an Mw/Mn of the propylene molding material as measured by GPC.

In a preferred embodiment of the invention, the reaction is carried out by adding 0.005 to 0.05% by weight, based on the crystalline polypropylene resin, of the peroxide to the crystalline polypropylene resin.

In a still preferred embodiment of the invention, the reaction is carried out by melt-kneading the mixture of the crystalline polypropylene resin and the peroxide at 180 to 280° C.

In another preferred embodiment of the invention, the crystalline polypropylene resin is a resin obtained by using a catalyst system comprising (A) a metallocene compound represented by formula (I):

$$Q^1(C_5H_{4-a}R^1{}_a)(C_5H_{4-b}R^2{}_b)MeX^1Y^1 \qquad (I)$$

wherein $(C_5H_{4-a}R^1{}_a)$ and $(C_5H_{4-b}R^2{}_b)$ are each a conjugated 5-membered cyclic ligand; $Q^1$ represents a linking group bridging the two conjugated 5-membered cyclic ligands which is selected from a divalent hydrocarbon group having 1 to 20 carbon atoms, a silylene group having a hydrocarbon group having 1 to 20 carbon atoms, and a germylene group having a hydrocarbon group having 1 to 20 carbon atoms; Me represents zirconium or hafnium; $X^1$ and $Y^1$ each represent a hydrogen atom, a halogen atom, a hydrocarbon group having 1 to 20 carbon atoms, an alkoxy group having 1 to 20 carbon atoms, an alkylamido group having 1 to 20 carbon atoms, a trifluoromethanesulfonic acid group, a phosphorus-containing hydrocarbon group having 1 to 20 carbon atoms or a silicon-containing hydrocarbon group having 1 to 20 carbon atoms; $R^1$ and $R^2$ each represent a hydrocarbon group having 1 to 30 carbon atoms, a halogen atom, an alkoxy group, a silicon-containing hydrocarbon group, a phosphorus-containing hydrocarbon group, a nitrogen-containing hydrocarbon group or a boron-containing hydrocarbon group; a and b each represent an integer of 0 to 4; where a or b is 2 or more, two adjacent $R^1$'s or $R^2$'s may be taken together to form a ring; and the two 5-membered cyclic ligands are asymmetrical with respect to a plane containing Me when viewed as to the relative positions thereof through the linking group $Q^1$, (B) an ion exchangeable layer compound except a silicate or an inorganic silicate, and (C) an organoaluminum compound.

The invention also provides a polypropylene molding material for spinning.

According to the invention, since trace amounts of high-molecular components, which cause filament breaking, in a polypropylene resin is decomposed by the chemical treatment with a peroxide (CR treatment), a polypropylene molding material having excellent high-speed spinnability can be obtained from a polypropylene resin having specific physical properties, such as one prepared by using a metallocene catalyst. The amount of the peroxide to be used is reduced to an minimum consistent with capability of decomposing the trace amounts of high-molecular components. It follows that by-production of low-molecular fragments, for example, components having about 20 to 70 carbon atoms, by the reaction between the polymer and the peroxide can be minimized, and fuming on molding is reduced thereby.

DETAILED DESCRIPTION OF THE INVENTION

The polypropylene molding material according to the invention is obtained by allowing a peroxide to react on a crystalline polypropylene resin.

The crystalline polypropylene resin, a base resin of the molding material of the invention, includes a propylene homopolymer and a propylene copolymer, such as a propylene random copolymer.

The propylene copolymer preferably has a propylene unit content of at least 95 mol % (i.e., less than 5 mol % of comonomers), which varies depending on the kind of the comonomer. Examples of useful comonomers include ethylene and α-olefins having 4 to 20 carbon atoms, such as 1-butene, 1-pentene, 3-methylbutene-1,1-hexene, 4-methylpentene-1, 1-heptene, 1-octene, 1-nonene, 1-decene, and 1-hexadecene. The propylene and comonomer unit contents as above referred to can be determined by $^{13}$C-NMR analysis with FT-NMR manufactured by Nihon Denshi (270 MHz).

The crystalline polypropylene resin preferably has such an Mw/Mn (=Q1) of 2 to 4, as measured by GPC.

For securing satisfactory high-speed spinnability, the crystalline polypropylene resin preferably has an MFR of 30 to 70 g/10 min, particularly 30 to 60 g/10 min.

While the process for preparing the crystalline polypropylene resin is not particularly limited, it is preferable to use the one obtained by polymerization in the presence of a metallocene catalyst system comprised of the following components A to C in order to obtain a molding material satisfying the conditions (A) to (D) hereinafter described in detail. Catalyst component A:

Component A is a metallocene compound represented by formula (I):

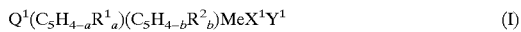

$$Q^1(C_5H_{4-a}R^1{}_a)(C_5H_{4-b}R^2{}_b)MeX^1Y^1 \quad (I)$$

wherein $(C_5H_{4-a}R^1{}_a)$ and $(C_5H_{4-b}R^2{}_b)$ are each a conjugated 5-membered cyclic ligand; $Q^1$ represents a linking group bridging the two conjugated 5-membered cyclic ligands which is selected from a divalent hydrocarbon group having 1 to 20 carbon atoms, a silylene group having a hydrocarbon group having 1 to 20 carbon atoms, and a germylene group having a hydrocarbon group having 1 to 20 carbon atoms; Me represents zirconium or hafnium; $X^1$ and $Y^1$ each represent a hydrogen atom, a halogen atom, a hydrocarbon group having 1 to 20 carbon atoms, an alkoxy group having 1 to 20 carbon atoms, an alkylamido group having 1 to 20 carbon atoms, a trifluoromethanesulfonic acid group, a phosphorus-containing hydrocarbon group having 1 to 20 carbon atoms or a silicon-containing hydrocarbon group having 1 to 20 carbon atoms; $R^1$ and $R^2$ each represent a hydrocarbon group having 1 to 30 carbon atoms, a halogen atom, an alkoxy group, a silicon-containing hydrocarbon group, a phosphorus-containing hydrocarbon group, a nitrogen-containing hydrocarbon group or a boron-containing hydrocarbon group; a and b each represent an integer of 0 to 4; where a or b is 2 or more, two adjacent $R^1$'s or $R^2$'s may be taken together to form a ring; and the two 5-membered cyclic ligands are asymmetrical with respect to a plane containing Me when viewed as to the relative positions thereof through the linking group $Q^1$.

In formula (I), $Q^1$ is a linking group bridging the two conjugated 5-membered cyclic ligands which is selected from (i) a divalent hydrocarbon group having 1 to 20 carbon atoms, preferably 1 to 6 carbon atoms, more specifically a divalent unsaturated hydrocarbon group, such as an alkylene group, a cycloalkylene group, or an arylene group, (ii) a silylene group having a hydrocarbon group containing 1 to 20, preferably 1 to 12, carbon atoms, and (iii) a germylene group having a hydrocarbon group containing 1 to 20, preferably 1 to 12, carbon atoms. Where the linking group $Q^1$ is acyclic, its length, i.e., the distance between the two 5-membered cyclic ligands, is preferably 4 or less atoms, particularly 3 or less atoms, irrespective of the number of the carbon atoms in $Q^1$. Where $Q^1$ has a cyclic group, the distance is preferably (the cyclic group+2 or less atoms), particularly only the cyclic group. Accordingly, the alkylene group as $Q^1$ is preferably an ethylene group or an isopropylidene group (the distance between the two ligands is 2 atoms or 1 atom, respectively); the cycloalkylene group as $Q^1$ is preferably a cyclohexylene group (the distance is only the cyclohexylene group); and the alkylsilylene group as $Q^1$ is preferably a dimethylsilylene group (the distance is one atom).

Me is zirconium or hafnium. $X^1$ and $Y^1$ which may be the same or different, each independently represent (i) a hydrogen atom, (ii) a halogen atom (i.e., fluorine, chlorine, bromine or iodine, preferably chlorine), (iii) a hydrocarbon group containing 1 to 20 carbon atoms, preferably 1 to 12 carbon atoms, (iv) an alkoxy group containing 1 to 20 carbon atoms, preferably 1 to 12 carbon atoms, (v) an alkylamido group containing 1 to 20 carbon atoms, preferably 1 to 12 carbon atoms, (vi) a phosphorus-containing hydrocarbon group containing 1 to 20 carbon atoms, preferably 1 to 12 carbon atoms, (vii) a silicon-containing hydrocarbon group containing 1 to 20 carbon atoms, preferably 1 to 12 carbon atoms, or (viii) a trifluoromethanesulfonic acid group.

$R^1$ and $R^2$ each independently represent a hydrocarbon group containing 1 to 20 carbon atoms, a halogen atom, an alkoxy group, a silicon-containing hydrocarbon group, a phosphorus-containing hydrocarbon group, a nitrogen-containing hydrocarbon group or a boron-containing hydrocarbon group, and a and b each represent an integer of 0 to 4. Where a or b is 2 or greater, two $R^1$'s on adjacent carbon atoms or two $R^2$'s on adjacent carbon atoms may be connected to each other to form a ring.

Illustrative examples of the metallocene compound represented by formula (I) are given in JP-A-8-208733, including dimethylsilylenebis (2,4-dimethylindenyl)zirconium dichloride, dimethylsilylenebis (2-methyl-4-isopropylindenyl)zirconium dichloride, dimethylsilylenebis (2-methyl-4-phenylindenyl)zirconium dichloride, and dimethylsilylenebis (2-methyl-4,5-benzoindenyl)zirconium dichloride. Preferred of them are dimethylsilylenebis(2-methyl-4,5-benzoindenyl)zirconium dichloride and dimethylsilylenebis(2-methyl-4-phenylindenyl)zirconium dichloride.

Catalyst Component B:

Catalyst component B is at least one compound selected from the group consisting of (B-1) an aluminumoxy compound, (B-2) a Lewis acid, and (B-3) an ionic compound capable of reacting with catalyst component A to convert the catalyst component A to a cation. Some of Lewis acids are regarded as an ionic compound capable of reacting with catalyst component A to convert it to a cation. For the sake of convenience, such compounds are included under either component B-2 or B-3.

Specific examples of components B-1, B-2 and B-3 and processes for preparing them are described in JP-A-6-239914 and JP-A-8-208733. For example, component B-1 includes (i) alumoxanes obtained from a kind of a trialkylaluminum and water, such as methylalumoxane, ethylalumoxane, butylalumoxane, and isobutylalumoxane; (ii) alumoxanes obtained from two kinds of trialkylaluminums and water, such as methylethylalumoxane, methylbutylalumoxane, and methylisobutylalumoxane; and an alkylboronic acid, such as methylboronic acid, ethylboronic acid, butylboronic acid, and isobutylboronic acid. Specific examples of component B-3 include triphenylcarbonium tetrakis(pentafluorophenyl)borate. Specific examples of component B-2 include triphenylboron, tris(3,5-difluorophenyl)boron, tris(pentafluorophenyl) borate, N,N-dimethylanilinium tetrakis(pentafluorophenyl)borate.

Catalyst Component C:

Catalyst component C is an organoaluminum compound, which is used when necessary. Preferred organoaluminum compounds include those represented by formula (II):

$$(AlR^4_n X_{3-n})_m \quad (II)$$

wherein $R^4$ represents an alkyl group having 1 to 20 carbon atoms, preferably 1 to 10 carbon atoms; X represents a halogen atom, a hydrogen atom, an alkoxy group or an amino group; n represents an integer of 1 to 3, preferably 2 or 3; and m represents 1 or 2, preferably 1.

Specific examples of the organoaluminum compounds represented by formula (II) are trimethylaluminum, triethylaluminum, tri(n-propyl)aluminum, tri(n-butyl) aluminum, triisobutylaluminum, tri(n-hexyl)aluminum, tri (n-octyl) aluminum, tri(n-decyl) aluminum, diethylaluminum chloride, diethylaluminum sesquichloride, diethylaluminum hydride, diethylaluminum ethoxide, diethylaluminum dimethylamide, diisobutylaluminum hydride, and diisobutylaluminum chloride. Preferred of them are trialkylaluminums (m=1, n=3) and alkylaluminum hydrides. Still preferred are trialkylaluminums having 1 to 8 carbon atoms in the alkyl moiety $R^4$.

The metallocene catalyst system comprising catalyst components A and B and, if desired, catalyst component C, which is used in the production of the preferred crystalline polypropylene resin, is prepared by bringing these catalyst components into contact with each other either inside or outside a polymerization vessel in the presence or absence of monomers.

The metallocene catalyst system can be supported on a finely particulate solid carrier to provide a solid catalyst. The finely particulate solid useful as a carrier includes inorganic porous oxides, such as silica and alumina; and organic homo- or copolymers mainly comprising ethylene, an α-olefin (e.g., propylene or 1-butene) or styrene.

The catalyst system may be such that has been subjected to preliminary polymerization of an olefin. Suitable olefins to be preliminarily polymerized include propylene, ethylene, 1-butene, 3-methylbutene-1, styrene, and divinylbenzene, or mixtures thereof with other olefins.

While the proportions of the catalyst components A, B, and C to be used are arbitrary, preferred ranges generally depend on the kind of the selected catalyst component B. In using component B-1 as catalyst component B, the atomic ratio of the aluminum atom in component B-1 to the transition metal (Me) in component A, i.e., Al/Me preferably ranges from 1 to 100,000, preferably from 10 to 10,000, still preferably from 50 to 5,000. In using components B-2 or B-3, the molar ratio of the transition metal (Me) in component A to component B-2 or B-3 preferably ranges from 0.1 to 1,000, still preferably 0.5 to 100, particularly preferably 1 to 50.

Where component C is used, the molar ratio of component C to component A is preferably $10^5$ or less, still preferably $10^4$ or less, particularly preferably $10^3$ or less.

A particularly preferred metallocene catalyst system is composed of (A) a metallocene compound represented by formula (I), (B) an ion exchangeable layer compound except a silicate or an inorganic silicate, and (C) an organoaluminum compound. Catalyst component (A):

Component (A) is a metallocene compound represented by formula (I):

$$Q^1(C_5H_{4-a}R^1_a)(C_5H_{4-b}R^2_b)MeX^1Y^1 \quad (I)$$

wherein $(C_5H_{4-a}R^1_a)$ and $(C_5H_{4-b}R^2_b)$ are each a conjugated 5-membered cyclic ligand; $Q^1$ represents a linking group bridging the two conjugated 5-membered cyclic ligands which is selected from a divalent hydrocarbon group having 1 to 20 carbon atoms, a silylene group having a hydrocarbon group having 1 to 20 carbon atoms, and a germylene group having a hydrocarbon group having 1 to 20 carbon atoms; Me represents zirconium or hafnium; $X^1$ and $Y^1$ each represent a hydrogen atom, a halogen atom, a hydrocarbon group having 1 to 20 carbon atoms, an alkoxy group having 1 to 20 carbon atoms, an alkylamido group having 1 to 20 carbon atoms, a trifluoromethanesulfonic acid group, a phosphorus-containing hydrocarbon group having 1 to 20 carbon atoms or a silicon-containing hydrocarbon group having 1 to 20 carbon atoms; $R^1$ and $R^2$ each represent a hydrocarbon group having 1 to 30 carbon atoms, a halogen atom, an alkoxy group, a silicon-containing hydrocarbon group, a phosphorus-containing hydrocarbon group, a nitrogen-containing hydrocarbon group or a boron-containing hydrocarbon group; a and b each represent an integer of 0 to 4; where a or b is 2 or more, two adjacent $R^1$'s or $R^2$'s may be taken together to form a ring; and the two 5-membered cyclic ligands are asymmetrical with respect to a plane containing Me when viewed as to the relative positions thereof through the linking group $Q^1$.

In formula (I), $Q^1$ is a linking group bridging the two conjugated 5-membered cyclic ligands which is selected from (i) a divalent hydrocarbon group having 1 to 20 carbon atoms, preferably 1 to 6 carbon atoms, more specifically a divalent unsaturated hydrocarbon group, such as an alkylene group, a cycloalkylene group, or an arylene group, (ii) a silylene group having a hydrocarbon group containing 1 to 20, preferably 1 to 12, carbon atoms, and (iii) a germylene group having a hydrocarbon group containing 1 to 20, preferably 1 to 12, carbon atoms. Where the linking group $Q^1$ is acyclic, its length, i.e., the distance between the two 5-membered cyclic ligands, is preferably 4 or less atoms, particularly 3 or less atoms, irrespective of the number of the carbon atoms in $Q^1$. Where $Q^1$ has a cyclic group, the distance is preferably (the cyclic group+2 or less atoms), particularly only the cyclic group. Accordingly, the alkylene group as $Q^1$ is preferably an ethylene group or an isopropylidene group (the distance between the two ligands is 2 atoms or 1 atom, respectively); the cycloalkylene group as $Q^1$ is preferably a cyclohexylene group (the distance is only the cyclohexylene group); and the alkylsilylene group as $Q^1$ is preferably a dimethylsilylene group (the distance is one atom).

Me is zirconium or hafnium, preferably zirconium. $X^1$ and $Y^1$, which may be the same or different, each represent (i) a hydrogen atom, (ii) a halogen atom (i.e., fluorine, chlorine, bromine or iodine, preferably chlorine), (iii) a hydrocarbon group containing 1 to 20 carbon atoms, (iv) an alkoxy group containing 1 to 20 carbon atoms, (v) an alkylamido group containing 1 to 20 carbon atoms, (vi) a phosphorus-containing hydrocarbon group containing 1 to 20 carbon atoms, (vii) a silicon-containing hydrocarbon group containing 1 to 20 carbon atoms, or (viii) a trifluoromethanesulfonic acid group.

$R^1$ and $R^2$, which are substituents on the conjugated 5-membered cyclic ligands, each independently represent a hydrocarbon group containing 1 to 30 carbon atoms, a halogen atom, an alkoxy group having 1 to 30 carbon atoms, a silicon-containing hydrocarbon group having 3 to 30 carbon atoms, a phosphorus-containing hydrocarbon group having 2 to 30 carbon atoms, a nitrogen-containing hydrocarbon group having 2 to 30 carbon atoms or a boron-containing hydrocarbon group having 2 to 30 carbon atoms, and a and k each represent an integer of 0 to 4. Where a or b is 2 or greater, two $R^1$'s on adjacent carbon atoms or two $R^2$'s on adjacent carbon atoms may be connected to each other to form a ring together with part of the cyclopentadienyl ring. For example, two $R^1$'s or two $R^2$'s form a condensed 5-membered ring (e.g., an indenyl group or a fluorenyl group) or a condensed 7-membered ring (e.g., azulenyl group) sharing the double bonds of the cyclopentadienyl ring. Preferred of such condensed ring structures are a 2,4-substituted indenyl group, a 2,4-substituted azulenyl group, and their derivatives. Still preferred are a 2,4-substituted azulenyl group and its derivatives. Preferred substituents at the 2-position include hydrocarbon groups having 1 to 10 carbon atoms, particularly an alkyl group having 1 to 6 carbon atoms. Preferred substituents at the 4-position include an aryl, alkylaryl, halogenated aryl or halogenated alkylaryl group having 6 to 15 carbon atoms, particularly, an aryl, alkylaryl, halogenated aryl or halogenated alkylaryl group having 6 to 12 carbon atoms.

a and b each represent an integer of from 0 to 4.

Illustrative examples of the metallocene compound represented by formula (I) are shown below. Needless to say, the following compounds, merely expressed by chemical nomenclature, have an "asymmetric steric structure" as intended in the present invention.

(A-1) Transition metal compounds having two silylene-bridged 5-membered cyclic ligands, such as (1) dimethylsilylenebis(1-indenyl)zirconium dichloride,
(2) dimethylsilylenebis[1-(4,5,6,7-tetrahydroindenyl)]zirconium dichloride,
(3) dimethylsilylenebis[1-(2,4-dimethylindenyl)]zirconium dichloride,
(4) dimethylsilylenebis[1-(2-methyl-4-phenylindenyl)]zirconium dichloride,
(5) dimethylsilylenebis[1-(2-methyl-4,5-benzoindenyl)]zirconium dichloride,
(6) dimethylsilylenebis[1-(2-methyl-4-(1-naphthyl)indenyl)]zirconium dichloride,
(7) dimethylsilylenebis[1-(2-methyl-4-isopropylindenyl)]zirconium dichloride,
(8) dimethylsilylenebis[1-(2-methyl-4,6-diisopropylindenyl)]zirconium dichloride,
(9) dimethylsilylenebis[1-(2-methylindenyl)]zirconium dichloride,
(10) methylphenylsilylenebis(1-indenyl)zirconium dichloride,
(11) methylphenylsilylenebis[1-(4,5,6,7-tetrahydroindenyl)]zirconium dichloride,
(12) methylphenylsilylenebis[1-(2,4-dimethylindenyl)]zirconium dichloride,
(13) methylphenylsilylenebis[1-(2-methyl-4-phenylindenyl)]zirconium dichloride,
(14) methylphenylsilylenebis[1-(2-methyl-4,5-benzoindenyl)]zirconium dichloride,
(15) methylphenylsilylenebis[1-(2-methyl-4-(1-naphthyl)indenyl)]zirconium dichloride,
(16) methylphenylsilylenebis[1-(2-methyl-4-isopropylindenyl)]zirconium dichloride,
(17) methylphenylsilylenebis[1-(2-methyl-4,6-diisopropylindenyl)]zirconium dichloride,
(18) methylphenylsilylenebis[1-(2-methylindenyl)]zirconium dichloride,
(19) dimethylsilylenebis[1-(2-methyl-4,5-benzoindenyl)]zirconium dimethyl,
(20) dimethylsilylenebis[1-(2-methyl-4,6-diisopropylindenyl)]zirconium dimethyl,
(21) dimethylsilylenebis[1-(2-methyl-4-phenylindenyl)]zirconium dimethyl,
(22) dimethylsilylenebis[1-(2-methyl-4-phenylindenyl)]zirconium chloromethylamide,
(23) dimethylsilylenebis[1-(2-methyl-4-(pentafluorophenyl)indenyl)]zirconium dichloride,
(24) dimethylsilylenebis[1-(2-methyl-4-phenyl-dihydroazulenyl)]zirconium dichloride,
(25) dimethylsilylenebis[1-(2-methyl-4-phenyl-hexahydroazulenyl)]zirconium dichloride,
(26) dimethylsilylenebis[1-(2-methyl-4-(1-naphthyl)-dihydroazulenyl)]zirconium dichloride,
(27) dimethylsilylenebis[1-(2-methyl-4-(1-naphthyl)-hexahydroazulenyl)]zirconium dichloride,
(28) methylphenylsilylenebis[1-(2-methyl-4-phenyl-hexahydroazulenyl)]zirconium dichloride,
(29) dimethylsilylenebis[1-(2-ethyl-4,5-benzoindenyl)]zirconium dichloride,
(30) dimethylsilylenebis[1-(2-ethyl-4-phenylindenyl)]zirconium dichloride,
(31) dimethylsilylenebis[1-(2-ethyl-4-phenyl-dihydroazulenyl)]zirconium dichloride,
(32) dimethylsilylenebis[1-(2-ethyl-4-phenyl-hexahydroazulenyl)]zirconium dichloride,
(33) dimethylsilylene[1-(2-ethyl-4-phenylindenyl)][1-(2,3,5-trimethylcyclopentadienyl)]zirconium dichloride,
(34) dimethylsilylene[1-(2-ethyl-4-phenyl-hexahydroazulenyl)][1-(2,3,5-trimethylcyclopentadienyl)]zirconium dichloride,
(35) dimethylsilylenebis[1-(2-methyl-4,4-dimethyl-sila-4,5,6,7-tetrahydroindenyl)]zirconium dichloride,
(36) dimethylsilylenebis[1-(2-ethyl-4-phenylindenyl)]zirconiumbis(trifluoromethanesulfonic acid),
(37) dimethylsilylenebis[1-(2-ethyl-4-phenyldihydroazulenyl)]zirconiumbis(trifluoromethanesulfonic acid),
(38) dimethylsilylenebis[1-(2-ethyl-4-phenyl-hexahydroazulenyl)]zirconiumbis(trifluoromethanesulfonic acid),
(39) dimethylsilylenebis[1-(2-ethyl-4-(pentafluorophenyl)indenyl)]zirconium dichloride,
(40) dimethylsilylenebis[1-(2-ethyl-4-phenyl-7-fluoroindenyl)]zirconium dichloride,
(41) dimethylsilylenebis[1-(2-ethyl-4-indolylindenyl)]zirconium dichloride,
(42) dimethylsilylenebis[1-(2-dimethylborano-4-indolylindenyl)]zirconium dichloride,
(43) dimethylsilylenebis[1-(2-methyl-4-(pentafluorophenyl)dihydroazulenyl)]zirconium dichloride,
(44) dimethylsilylenebis[1-(2-methyl-4-(pentafluorophenyl)-hexahydroazulenyl)]zirconium dichloride,
(45) dimethylsilylenebis[1-(2-ethyl-4-(pentafluorophenyl)dihydroazulenyl)]zirconium dichloride,
(46) dimethylsilylenebis[1-(2-ethyl-4-(pentafluorophenyl)-hexahydroazulenyl)]zirconium dichloride,
(47) dimethylsilylenebis[1-(2-ethyl-4-(3-methylphenyl)dihydroazulenyl)]zirconium dichloride,
(48) dimethylsilylenebis[1-(2-ethyl-4-(4-methylphenyl)dihydroazulenyl)]zirconium dichloride,
(49) dimethylsilylenebis[1-(2-ethyl-4-(3,5-dimethylphenyl)dihydroazulenyl)]zirconium dichloride,
(50) dimethylsilylenebis[1-(2-ethyl-4-(3,5-bistrifluoromethylphenyl)dihydroazulenyl)]zirconium dichloride,

(51) dimethylsilylenebis[1-(2-methyl-4-(1-naphthyl)dihydroazulenyl)]zirconium dichloride,
(52) dimethylsilylenebis[1-(2-ethyl-4-(1-naphthyl)dihydroazulenyl)]zirconium dichloride,
(53) dimethylsilylenebis[1-(2-methyl-4-phenyl-6-isopropyldihydroazulenyl)]zirconium dichloride,
(54) dimethylsilylenebis[1-(2-ethyl-4-phenyl-6-isopropyldihydroazulenyl)]zirconium dichloride, and
(55) dimethylsilylenebis[1-(2-ethyl-4,6-diphenyldihydroazulenyl)]zirconium dichloride.

(A-2) Transition metal compounds having two alkylene-bridged 5-membered cyclic ligands, such as
(1) ethylene-1,2-bis(1-indenyl)zirconium dichloride,
(2) ethylene-1,2-bis[1-(4,5,6,7-tetrahydroindenyl)]zirconium dichloride,
(3) ethylene-1,2-bis[1-(2,4-dimethylindenyl)]zirconium dichloride,
(4) ethylene-1,2-bis{1-(2-methyl-4-phenylindenyl)]zirconium dichloride,
(5) ethylene-1,2-bis[1-(2-methyl-4,5-benzoindenyl)]zirconium dichloride,
(6) ethylene-1,2-bis[1-(2-methyl-4-(1-naphthyl)indenyl)]zirconium dichloride,
(7) ethylene-1,2-bis[1-(2-ethyl-4-phenyl-hexahydroazulenyl)]zirconium dichloride,
(8) ethylene-1,2-bis[1-(2-ethyl-4-phenylazulenyl)]zirconium dichloride,
(9) ethylene-1,2-bis[1-(2-methyl-4-phenyl-hexahydroazulenyl)]zirconium dichloride,
(10) ethylene-1,2-bis[1-(2-methyl-4-phenyldihydroazulenyl)]zirconium dichloride,
(11) isopropylidenebis[1-(2-methyl-4-phenyl-hexahydroazulenyl)]zirconium dichloride, and
(12) isopropylidenebis[1-(2-methyl-4-phenyldihydroazulenyl)]zirconium dichloride.

(A-3) Transition metal compounds having two 5-membered cyclic ligands bridged by a hydrocarbon group containing germanium, aluminum, boron, phosphorus or nitrogen, such as
(1) dimethylgermylenebis(1-indenyl)zirconium dichloride,
(2) dimethylgermylenebis[1-(2-methyl-4-phenylindenyl)]zirconium dichloride,
(3) dimethylgermylenebis[1-(2-methyl-4,5-benzoindenyl)]zirconium dichloride,
(4) methylaluminumbis(1-indenyl)zirconium dichloride,
(5) phenylphosphinobis(1-indenyl)zirconium dichloride,
(6) ethylboranobis(1-indenyl)zirconium dichloride, and
(7) phenylaminobis(1-indenyl)zirconium dichloride. Catalyst component (B):

Catalyst Component (B) is at least one compound selected from the group consisting of (B-1) an ion exchangeable layer compound except silicates (hereinafter simply referred to as an ion exchangeable layer compound) and (B-2) an inorganic silicate. The ion exchangeable layer compounds include ion crystal compounds having a layer crystal structure, such as a hexagonal closest-packed structure, an antimony structure, a cadmium chloride structure, and a cadmium iodide structure. Specific examples of the ion exchangeable layer compounds are crystalline acid salts of polyvalent metals, such as $\alpha$-Zr(HAsO$_4$)$_2$.H$_2$O, $\alpha$-Zr(HPO$_4$)$_2$, $\alpha$-Zr(KPO$_4$)$_2$.3 H$_2$O, $\alpha$-Ti (HPO$_4$)$_2$, $\alpha$-Ti (HAsO$_4$)$_2$.H$_2$O, $\alpha$-Sn(HPO$_4$)$_2$.H$_2$O, $\gamma$-Zr(HPO$_4$)$_2$, $\gamma$-Ti (HPO$_4$)$_2$, and $\gamma$-Ti(NH$_4$PO$_4$)$_2$.H$_2$O.

If desired, the ion exchangeable layer compound can be subjected to a salt treatment and/or an acid treatment before use. The ion exchangeable layer (B-1) compound before a salt or acid treatment is a compound having a layer structure made of a plurality of planes stacked in parallel with a weak bonding force through an ionic bond, etc. and containing exchangeable ions.

The inorganic silicate (B-2) includes clay, clay minerals, zeolite, and diatomaceous earth. They may be either naturally occurring or artificial. Specific examples of the clay and clay minerals include allophane group minerals, such as allophane; kaoline group minerals, such as dickite, nacrite, kaolinite, and anauxite; halloysite group minerals, such as metahalloysite and halloysite; serpentine group minerals, such as chrysotile, lizardite, and antigorite; smectite group minerals, such as montomorillonite, sauconite, beidellite, nontronite, saponite, and hectorite; vermiculite group minerals, such as vermiculite; mica group minerals, such as illite, sericite, and glauconite; attapulgite, sepiolite, palygorskite, bentonite, kibushi clay, gairome clay, hisingerite, pyrophyllite, and chlorite group minerals. These minerals may form mixed layers in combination. Artificial inorganic silicates include synthetic mica, synthetic hectorite, synthetic saponite, and synthetic taeniolite.

Of these inorganic silicates preferred are kaolin group minerals, halloysite group minerals, serpentine group minerals, smectite group minerals, vermiculite group minerals, mica group minerals, synthetic mica, synthetic hectorite, synthetic saponite, and synthetic taeniolite. Still preferred are smectite group minerals, vermiculite group minerals, synthetic mica, synthetic hectorite, synthetic saponite, and synthetic taeniolite. They can be used either as such without any treatment or after such treatment as grinding in a ball mill or sieving. They can be used either individually or as a mixture of two or more thereof.

If desired, the inorganic silicate can be subjected to a salt treatment and/or an acid treatment to have controlled acid strength. A salt treatment are to form an ion complex, a molecule complex, an organic derivative, and the like to change the surface area or the interlaminar distance. That is, the ion exchanging properties can be taken advantage of to displace the interlaminar exchangeable ions with bulkier ions so as to have an increased interlaminar distance.

While the ion exchangeable layer compound or the inorganic silicate is used as untreated, it is preferred that the exchangeable metallic cations contained therein be replaced with cations dissociated from the following salts and/or acids. The salts which can be used for the ion exchange are compounds composed of a cation containing at least one atom selected from the group consisting of the elements belonging to groups 1 to 14 of the Periodic Table, preferably those composed of a cation containing at least one atom selected from the group consisting of the elements belonging to groups 1 to 14 of the Periodic Table and an anion derived from at least one atom or atomic group selected from the group consisting of a halogen atom, an organic acid, and an inorganic acid, still preferably those composed of a cation containing at least one atom selected from the group consisting of 2 to 14 group elements and at least one anion selected from the group consisting of Cl, Br, I, F, PO$_4$, SO$_4$, NO$_3$, CO$_3$, C$_2$O$_4$, ClO$_4$, OOCCH$_3$, CH$_3$COCHCOCH$_3$, OCl$_2$, O(NO$_3$)$_2$, O(ClO$_4$)$_2$, O(SO$_4$), OH, O$_2$Cl$_2$, OCl$_3$, OOCH, and OOCCH$_2$CH$_3$. These salts can be used either individually or as a combination of two or more thereof.

The acid to be used for the ion exchange is preferably selected from hydrochloric acid, sulfuric acid, nitric acid, acetic acid and oxalic acid. These acids can be used either individually or as a combination of two or more thereof. Where a salt treatment and an acid treatment are combined, a salt treatment can precede or follow an acid treatment, or the two treatments can be effected simultaneously, or a salt treatment can be followed simultaneously by a salt treatment and an acid treatment. The acid treatment not only serves for ion exchange and removal of surface impurities but is effective in dissolving a part of the cations of the crystal structure (e.g., Al, Fe, Mg, Li).

The conditions for carrying out the salt treatment and/or the acid treatment are not particularly limited but desirably selected so that at least part of the ion exchangeable layer compound or inorganic silicate may be dissolved. Such conditions are usually selected from a salt or acid concentration of from 0.1 to 30% by weight, a temperature of from room temperature up to the boiling point of the solvent used, and a treating time of from 5 minutes to 24 hours. The salt or acid is generally used in the form of an aqueous solution.

In case where the above-described salt treatment and/or acid treatment is performed, the shape of the ion exchangeable layer compound or inorganic silicate can be regulated by grinding or granulation before, during or after the treatment. Further, the salt treatment and/or acid treatment may be combined with other chemical treatments with an alkali, an organic compound, an organometallic compound, etc.

The thus treated component (B) preferably has such porosity that the volume of pores having a radius of not less than 20 A is 0.1 cc/g or more, particularly 0.3 to 5 cc/g, as measured by a mercury penetrating method. Such a component (B) usually contains adsorptive water and interlaminar water. The term "adsorptive water" means water adsorbed on the surface or the crystal fractured surface of the ion exchangeable layer compound or inorganic silicate. The term "interlaminar water" means water existing between the layers of a crystal.

It is desirable that component (B) be used after dehydration for removing the adsorptive water or interlaminar water. While not limiting, dehydration can be carried out by heating, heating in a gas stream, heating under reduced pressure, or azeotropy with an organic solvent. The heating temperature is such that neither adsorptive water nor interlaminar water may remain, usually 100° C. or higher, preferably 150° C. or higher. Too high temperatures causing structural destruction are unfavorable. The heating time is usually 0.5 hour or longer, preferably 1 hour or longer. The weight loss on dehydration is preferably 3% by weight or less when dehydration is conducted by suction at 200° C. under 1 mmHg for 2 hours. Where component (B) having been dehydrated to a weight loss of 3% by weight or less is used, it is desirable to handle the dehydrated component (B) so as to keep such a dehydrated state until the component (B) is brought into contact with essential component (A) and optional component (C).

The organoaluminum compound which can be used as component (C) is preferably a compound represented by formula (III):

$$AlR_aP_{3-a} \qquad (III)$$

wherein R represents a hydrocarbon group having 1 to 20 carbon atoms; P represents a hydrogen atom, a halogen atom, an alkoxy group or a siloxy group; and a represents a number greater than 0 and not greater than 3.

Specific examples of the organoaluminum compound represented by formula (III) include a trialkylaluminum, such as trimethylaluminum, triethylaluminum, tripropylaluminum, and triisobutylaluminum; and a halogen- or alkoxy-containing alkylaluminum, such as diethylaluminum monochloride and diethylaluminum monomethoxide. A trialkylaluminum is preferred of them. Aluminumoxy compounds, such as methylaluminoxane, are also useful as component (C). The organoaluminum compound represented by formula (III) and the aluminumoxy compound can be used in combination.

The above-described preferred catalyst system is prepared by bringing components (A) and (B) and, if desired, component (C) into contact with each other in, for example, the following manners (1) to (5). Note that the "contact" may be not only at the preparation of the catalyst system but at the time of preliminary polymerization of an olefin(s) or polymerization of an olefin(s).

(1) Component (A) and component (B) are brought into contact.

(2) Component (A) and component (B) are brought into contact, and component (C) is added to the resulting mixture.

(3) Component (A) and component (C) are brought into contact, and component (B) is added to the resulting mixture.

(4) Component (B) and component (C) are brought into contact, and component (A) is added to the resulting mixture.

(5) Components (A), (B), and (C) are brought into contact altogether.

On or after the contact of the components, a polymer, such as polyethylene or polypropylene or a solid inorganic oxide, such as silica or alumina, may be present in the catalyst preparation system or may be brought into contact with the catalyst.

The contact of the components (A), (B) and (C) can be carried out in an inert hydrocarbon solvent, such as pentane, hexane, heptane, toluene or xylene, in an inert gas atmosphere, such as nitrogen. The contact is effected at –20° C. up to the boiling point of the solvent used, preferably at room temperature up to the boiling point of the solvent.

Component (A) is used in an amount usually of from $10^{-4}$ to 10 mmol, preferably of from $10^{-2}$ to 5 mmol, per gram of component (B). Component (C) is used in an amount usually of from 0.01 to $10^4$ mmol, preferably of from 0.1 to 100 mmol, per gram of component (B). The atomic ratio of the transition metal in component (A) to the aluminum in component (C) is usually in the range of from 1:0.01 to $1:10^6$, preferably from 1:0.1 to $1:10^5$. The thus prepared catalyst system can be used as such or after washing.

If necessary, the catalyst system thus prepared can be combined with an additional amount of component (C). For example, where component (A) and/or component (B) and component (C) are used to prepare a catalyst, an additional amount of component (C) can be added separately to the reaction system. In this case, the amount of the component (C) to be added separately is selected so that the atomic ratio of the aluminum in the separately added component (C) to the transition metal in component (A) may range from 1:0 to $1:10^4$, preferably 1:1 to $1:10^3$.

Production of the crystalline polypropylene resin by use of the above-described metallocene catalyst system is carried out by bringing the monomer or monomers (i.e., propylene or a monomer mixture of propylene and ethylene or an α-olefin having 4 to 20 carbon atoms) into contact with the catalyst system by mixing to cause homo- or copolymerization. During the copolymerization the ratio of the monomers in the reaction system does not need to be constant. It might be convenient to supply the monomers at a given mixing ratio, or the mixing ratio of the monomers may be varied with time. Taking the copolymerization ratio into consideration, any one of the monomers may be fed in divided portions.

The mode of polymerization is not limited as long as each monomer can be brought into contact with the catalyst components efficiently. Suitable modes includes slurry polymerization using an inert solvent, bulk polymerization using substantially no solvent (propylene serves as a solvent), solution polymerization, and vapor phase polymerization using substantially no liquid solvent in which every monomer is substantially kept in a gaseous phase. Polymerization can be conducted either continuously or batchwise. Solvents useful in slurry polymerization include saturated aliphatic hydrocarbons and aromatic hydrocarbons, such as hexane, heptane, pentane, cyclohexane, benzene, and toluene, and mixtures thereof. The polymerization temperature ranges from −78° C. to 160° C., preferably from 0° to 150° C. Hydrogen can be used as an auxiliary molecular weight modifier. The polymerization pressure is usually from 0 to 90 kg/cm$^2$G, preferably 0 to 60 kg/cm$^2$G, still preferably 1 to 50 kg/cm$^2$G.

The polypropylene molding material of the invention is obtained by allowing a peroxide to react on the crystalline polypropylene resin.

While the peroxide to be used is not limited, 2,5-dimethyl-2,5-di(t-butylperoxy)hexane, 2,5-dimethyl-2,5-di(t-butylperoxy)hexyne-3, 1,3-bis(t-butylperoxyisopropyl)benzene, and the like are usually employed for the ease of handling and safety.

The peroxide is used in an minimum amount consistent with capability of decomposing the trace amounts of high-molecular components contained in the resin. A preferred amount of the peroxide is 0.005 to 0.05% by weight, particularly 0.01 to 0.03% by weight, based on the crystalline polypropylene resin. Where added in amounts less than 0.005% by weight, the peroxide tends to fail to sufficiently decompose the high-molecular components which cause filament breaks. The peroxide added in amounts more than 0.05% by weight will react with the polymer to produce a considerable amount of low-molecular weight fragments which tend to increase fuming on molding.

The reaction between the crystalline polypropylene resin and the peroxide is preferably carried out by mixing the peroxide into the crystalline polypropylene resin in the above-specified ratio by means of a Henschel mixer, a super mixer, a twin-cylinder mixer, a tumbling mixer, a ribbon blender, a Banbury mixer, a kneader blender, etc. and melt-kneading the resulting blend in an ordinary kneading machine, such as a single screw extruder or a twin screw extruder, usually at 180 to 280° C., preferably 230 to 260° C., followed by pelletizing.

If desired, additives commonly used as compounding additives for polyolefin resins can be added in the step of melt kneading in amounts that do not impair the effects of the present invention. Useful additives include nucleating agents, phenol type, phosphorus type or sulfur type antioxidants, neutralizing agents, light stabilizers, U absorbers, lubricants, antistatics, sequestering agents, fillers, antimicrobials, antifungals, fluorescent whitening agents, and so forth. These additives are usually added in an amount of 0.001 to 1% by weight, preferably 0.01 to 0.5% by weight, based on the total polypropylene molding material.

The polypropylene molding material of the invention have the following physical properties (A) to (D).

(A) MFR and Mw/Mn

The polypropylene molding material of the invention has an MFR of 20 to 100 g/10 min, preferably 30 to 60 g/10 min, and an Mw/Mn (=Q2) of 1.5 to 3.5, preferably 2.0 to 3.0, as measured by GPC. A polypropylene molding material whose Mw/Mn exceeds 3.5 or whose MFR is less than 20 g/10 min has difficulty in drawing at a high draw ratio only to provide filaments having non-uniform diameter or non-uniform strength. On the other hand, a polypropylene molding material whose Mw/Mn is smaller than 1.5 or whose MFR exceeds 100 g/10 min fails to have sufficient melt tension for drawing at a high draw ratio, resulting in breaks-off of the filament.

(B) $C_{20-70}$ Hydrocarbon Content

The $C_{20-70}$ hydrocarbon content of the polypropylene molding material of the invention should be 0.05% by weight or smaller, preferably 0.03% by weight or smaller. The term "hydrocarbons having 20 to 70 carbon atoms ($C_{20-70}$ hydrocarbons)" as referred to herein is intended to mean those which have mainly been by-produced on polymerization of propylene or on reaction between the crystalline polypropylene resin and the peroxide during melt-kneading. Hence, compounding additives that have been added in the preparation of the molding material, such as antioxidants and neutralizing agents, are not included under this term. If the $C_{20-70}$ hydrocarbon content exceeds 0.05% by weight, the molding material gives off a considerable amount of fumes during molding, which is unfavorable to production process.

(C) Mean Elution Temperature ($T_{50}$) and Degree of Variation of Elution ($\sigma$)

The polypropylene molding material of the invention has an elution curve, as obtained by TREF (temperature rising elution fractionation), showing a mean elution temperature $T_{50}$ of 75 to 120° C., preferably 80 to 120° C., and a degree of variation of elution $\sigma$ of 9 or smaller, preferably 8 or smaller.

TREF is a method for determining the composition distribution (distributions of molecular weight and crystallinity) of a polymer, which comprises completely dissolving a polymer at a given high temperature in the presence of an inert carrier, followed by cooling to form a thin polymer layer on the surface of the inert carrier, elevating the temperature either continuously or stepwise, collecting the dissolved component (dissolved polymer), continuously detecting the concentration of the dissolved component, and plotting the calculated amount of the dissolved component against the temperature to prepare an elution curve, from which the composition distribution of the polymer can be determined. For the details of TREF and apparatus used therefor, refer to *Journal of Applied Polymer Science*, vol. 26, pp. 4217–4231 (1981).

The term "mean elution temperature $T_{50}$" denotes the temperature at which the cumulative weight of the dissolved polymer reaches 50%. If $T_{50}$ is lower than 75° C., which means the resin material contains low-molecular components or low-crystalline components in too large proportions, the molding material emits an increased amount of fumes on molding, or the resulting fibers are sticky. The term "degree of variation of elution" as used herein denotes a difference between the temperature at which the cumulative weight of the dissolved polymer reaches 15.9% ($T_{15.9}$) and the temperature at which the cumulative weight of the dissolved polymer reaches 81.4% ($T_{81.4}$) as is represented by equation:

$$\sigma = T_{81.4} - T_{15.9}$$

A molding material whose $\sigma$ exceeds 9 contains too large amounts of components of low stereospecificity which hinders crystallinity. Such a material has reduced spinning properties, and the resulting fibers are sticky.

An elution curve obtained by TREF varies according to the distribution of molecular weight and of crystallinity of the polymer and can have one or more peaks. Where the polypropylene molding material of the invention is depicted by an elution curve having two or more peaks, it is required that the $T_{50}$ and σ of the peak at the highest temperature should fall within the above-specified range.

(D) Q2/Q1

The Mw/Mn of the crystalline polypropylene resin (before the reaction with the peroxide) being taken as Q1, and that of the polypropylene molding material obtained therefrom being taken as Q2, Q2/Q1 should fall within a range of from 0.75 to 0.95. A ratio Q2/Q1 exceeding 0.95 implies that the high-molecular components, which cause filament breaks, have not been decomposed sufficiently with the peroxide so that the fear of filament's breaking sill remains. A ratio Q2/Q1 less than 0.75 means that too large a quantity of the peroxide has been used so that a good deal of low-molecular fragments must have been produced as a result of the reaction between the polymer and such a large quantity of the peroxide. It naturally follows that the fuming on molding increases.

According to the invention, a crystalline polypropylene resin prepared by using a metallocene catalyst system is subjected to CR treatment with a smaller amount of a peroxide than has been used conventionally. By this CR treatment, trace amounts of high-molecular components which are contained in the resin and cause filament breaks can be decomposed sufficiently while preventing the peroxide from excessively reacting on the polymer to develop low-molecular fragments. Hence the polypropylene molding material of the invention exhibits excellent moldability in high-speed spinning with minimized fumes and is therefore suitable for spinning, especially high-speed spinning.

Spinning of the polypropylene molding material of the invention can be conducted by, for example, a melt spinning technique, such as spun bonding, in which pellets of the molding material are melted by heating and extruded through small orifices of a spinning nozzle. The polypropylene molding material of the invention manifests its excellent effects particularly when applied to high-speed spinning at a take-up speed, e.g., of 2000 m/min or higher. Molded articles obtained by such spinning typically include non-woven fabric. While the diameter of the spun filaments is not particularly limited, the effects of the invention are appreciable particularly in forming filaments of about 10 to 300 μm in diameter.

The invention will now be illustrated in greater detail with reference to Examples and Comparative Examples, but it should be understood that the invention is not limited thereto. Unless otherwise noted, all the percents are given by weight. Materials used or prepared in Examples and Comparative Examples were evaluated as follows.

(1) MFR

Measured in accordance with JIS-K6758 (polypropylene test method; 230° C., 2.16 kgf).

(2) Mw/Mn

Mw and Mn were measured by GPC under the following conditions.
Apparatus: GPC Model 150C, manufactured by Waters.
Column: three AD80M/S columns, manufactured by Showa Denko K.K.
Measuring temperature: 140° C.
Concentration: 20 mg/10 ml
Solvent: o-dichlorobenzene (3) $C_{20-70}$ Hydrocarbon Content The polypropylene molding material prepared was extracted with n-hexane by a high temperature Soxhlet extraction method. The resulting extract was an alyzed on a gas chromatograph (HP5890, manufactured by Hewlett Packard) using a capillary column.

(4) Mean Elution Temperature $T_{50}$ and Degree of Variation of Elution σ

The polypropylene molding material prepared was subjected to TREF under the following conditions. Fractions collected with a continuously or stepwise rising temperature were analyzed to prepare an elution curve (plots of amount of the dissolved polymer vs. temperature), from which $T_{50}$ and σ were obtained.
TREF Conditions:
Solvent: o-dichlorobenzene
Concentration: 4 mg/ml
Pour: 0.5 ml
Column: 4.6 mm (D)×150 mm
Cooling rate: 100° C.×120 min.

(5) Spinnability

The polypropylene molding material was spun through a 24-hole round spinneret at a resin temperature of 230° C. at an output of 0.8 g/min/hole and drawn at a take-up speed of 2800 m/min by means of a high-speed air flow. The number of filament breaks in 30 minutes' spinning was counted to evaluate the spinnability.

(6) Amount of fumes

The molding material was extracted from an extruder through a T-die. The mass concentration (mg/m$^3$) of the fumed particles generated from the molten resin extruded through the T-die, which was taken as an amount of fumes, was measured with a digital dust counter P-5H2 manufactured by Shibata Kagaku Kikai Kogyo K.K.

PREPARATION EXAMPLE

1) Preparation of (dimethylsilylenebis[1,1'-(2-methyl-4-phenyl-4-hydroazulenyl)]zirconium dichloride (catalyst component (A))

(a) Synthesis of Racemate/meso-form Mixture

In 30 ml of hexane was dissolved 2.22 g of 2-methylazulene synthesized in accordance with the method described in JP-A62-207232. To the solution was added 15.6 ml of a cyclohexane-diethyl ether solution of phenyl lithium (1.0 equiv.) at 0° C. in small portions. After stirring at room temperature for 1 hour, the solution was cooled to −78° C., and 30 ml of tetrahydrofuran was added thereto. To the solution was further added 0.95 ml of dimethyldichlorosilane, and the temperature was raised to room temperature. The mixture was stirred at 50° C. for 1.5 hours. An aqueous ammonium chloride solution was added thereto, followed by liquid-liquid separation. The organic layer was dried over magnesium sulfate, and the solvent was evaporated under reduced pressure. The resulting crude product was purified by silica gel column chromatography (hexane:dichloromethane=5:1) to give 1.48 g of dimethylbis[1,1'-(2-methyl-4-phenyl-1,4-dihydroazulenyl)]silane.

The dimethylbis [1,1'-(2-methyl-4-phenyl-1,4-dihydroazulenyl)]silane weighing 768 mg was dissolved in 15 ml of diethyl ether. To the solution was added dropwise 1.98 ml of a 1.64 mol/l solution of n-butyl lithium in hexane at −78° C., and the reaction solution was stirred for 12 hours while allowing the liquid temperature to gradually rise to room temperature. The solvent was evaporated under reduced pressure, and the resulting solid was washed with hexane and concentrated to dryness under reduced pressure. To the residue was added 20 ml of a 40:1 mixture of toluene and diethyl ether, and 325 mg of zirconium tetrachloride was further added at −60° C. The mixture was stirred for 15 hours while allowing the liquid temperature to elevate to room temperature. The reaction mixture was concentrated under reduced pressure, and hexane was added thereto to the concentrate to obtain 150 mg of a racemate/meso-form mixture of dimethylsilylenebis[1,1'-(2-methyl-4-phenyl-4-hydroazulenyl)]zirconium dichloride as a precipitate.

(b) Purification of Racemate

The racemate/meso-form mixture (887 mg) was dissolved in 30 ml of dichloromethane and transferred into a Pyrex glass-made container equipped with a 100 W high-pressure mercury lamp. The solution was irradiated with light (300 to 600 nm) for 30 minutes under atmospheric pressure while stirring to increase the proportion of the racemate in the mixture. Dichloromethane was evaporated under reduced pressure, and 7 ml of toluene was added to the residual yellow solid. After stirring, the mixture was allowed to stand to precipitate the yellow solid. The supernatant liquor was removed, and the solid was similarly washed successively with a 4 ml and a 2 ml portion of toluene and a 2 ml portion of hexane. The resulting solid was concentrated to dryness under reduced pressure to give 437 mg of racemic dimethylsilylenebis[1,1'-(2-methyl-4-phenyl-4-hydroazulenyl)]zirconium dichloride.

Chemical Shift of $^1$H-NMR of Racemate: 300 MHz, $C_6D_6$ (ppm) δ: 0.51 (s, 6H, Si$(CH_3)_2$), 1.92 (s, 6H, $CH_3$), 5.30 (br d, 2H), 5.75–5.95 (m, 6H), 6.13 (s, 2H), 6.68 (d, J=14 Hz, 2H), 7.05–7.20 (m, 2H, arom), 7.56 (d, J=7 Hz, 4H) Chemical shift of $^1$H-NMR of meso form: 300 MHz, $C_6D_6$ (ppm) δ: 0.44 (s, 6H, $SiCH_3$), 0.59 (s, 6H, $SiCH_3$), 1.84 (s, 6H, $CH_3$), 5.38 (br d, 2H), 5.75–6.00 (m, 6H), 6.13 (s, 2H), 6.78 (d, J=14 Hz, 2H), 7.00–7.20 (m, 2H, arom), 7.56 (d, J=7 Hz, 4H)

2) Preparation of Component (B)

One kilogram of montmorillonite (Kunipia F, produced by Kunimine Kogyo) was suspended in 6.3 of desalted water having dissolved therein 1.25 kg of magnesium chloride, and the suspension was stirred at 80° C. for 1 hour. The solid collected was washed with water and again suspended in 7 l of a 8% aqueous hydrochloric acid solution, stirred at 90° C. for 2 hours, followed by washing with desalted water. The resulting aqueous slurry of montmorillonite was adjusted to a solid concentration of 15% and spray dried to obtain spherical particles. The particles were dried in vacuo at 200° C. for 2 hours.

3) Preparation of Catalyst System

In a 0.3 l glass-made reactor equipped with stirring blades were put 5.04 g of the chemically treated montmorillonite particles prepared in (2) above, toluene, and a toluene solution of 30.2 mmol of triethylaluminum, followed by stirring at room temperature. One hour later, the particles were washed with toluene (percentage of residual solution: less than 1%). Then, 3.0 ml of a toluene slurry containing 0.0752 mmol of the (γ)-dimethylsilylenebis(2-methyl-4-phenyldihydroazulenyl)zirconium dichloride synthesized in (1) above and 0.93 ml of a toluene solution containing 0.75 mmol of triisobutylaluminum were put in a 100 ml-volume flask at room temperature, followed by stirring.

In a 1.0 l-volume agitated autoclave having been sufficiently purged with propylene was introduced 400 ml of n-heptane and kept at 40° C. To the autoclave was put 6.3 ml of a toluene solution containing 5.08 mmol of triisobutylaluminum, and the above-prepared chemically treated montmorillonite particles and the above-prepared toluene solution of (γ)-dimethylsilylenebis(2-methyl-4-phenyldihydroazulenyl)zirconium dichloride and triisobutylaluminum were then added thereto. The inner pressure was elevated up to 5 kg·f/cm², and the temperature and the pressure were maintained. Thirty minutes later, unreacted propylene was purged, and the slurry of the catalyst having the preliminarily polymerized polymer thereon was recovered by means of a syphon and dried at room temperature under reduced pressure. There was obtained a solid catalyst containing 1.47 g of polypropylene per gram.

Example 1

Five grams of an n-heptane solution of triisobutylaluminum, 45 kg of liquid propylene, and 7 NL of hydrogen were introduced into a 200 l-volume stirred autoclave having been thoroughly purged with propylene. While keeping the inner temperature at 30° C., 1.2 g (exclusive of the polymer component) of the solid catalyst prepared in Preparation Example was added thereto, and the temperature was elevated to 75° C. to initiate polymerization. After the reaction system was kept at that temperature for 3 hours, 100 ml of ethanol was added thereto to stop the reaction. The residual gas was purged to obtain 11 kg of crystalline polypropylene resin having an MFR of 34.5 g/10 min and Mw/Mn (Q1) of 3.02.

The resulting crystalline polypropylene resin was mixed with 0.011% of 2,5-dimethyl-2,5-di(t-butylperoxy)hexane and various antioxidants, and the mixture was melt-kneaded in a single screw extruder at a cylinder temperature of 250° C. to prepare a polypropylene molding material having an MFR of 52.2 g/10 min. The polypropylene molding material was found to have Mw/Mn (Q2) of 2.48 and a $C_{20-70}$ hydrocarbon content of 0.035%. Q2/Q1 was 0.82. The spinnability and the amount of fumes of the resulting polymer are shown in Table 1 below.

Example 2

A crystalline polypropylene resin having an MFR of 20.5 g/10 min and Mw/Mn (Q1) of 3.25 was prepared in the same manner as in Example 1, except for changing the hydrogen feed to 5.6 NL.

The resulting crystalline polypropylene resin was mixed with 0.006% of 2,5-dimethyl-2,5-di(t-butylperoxy)hexane and various antioxidants, and the mixture was melt-kneaded in a single screw extruder at a cylinder temperature of 250° C. to prepare a polypropylene molding material having an MFR of 25.8 g/10 min. The polypropylene molding material was found to have Mw/Mn (Q2) of 2.92 and a $C_{20-70}$ hydrocarbon content of 0.029%. Q2/Q1 was 0.90. The spinnability and the amount of fumes of the resulting polymer are shown in Table 1 below.

Example 3

A crystalline polypropylene resin having an MFR of 48.5 g/10 min and Mw/Mn (Q1) of 2.85 was prepared in the same manner as in Example 1, except for changing the hydrogen feed to 8 NL.

The resulting crystalline polypropylene resin was mixed with 0.045% of 2,5-dimethyl-2,5-di(t-butylperoxy)hexane and various antioxidants, and the mixture was melt-kneaded in a single screw extruder at a cylinder temperature of 250° C. to prepare a polypropylene molding material having an MFR of 93.6 g/10 min. The polypropylene molding material was found to have Mw/Mn (Q2) of 2.16 and a $C_{20-70}$ hydrocarbon content of 0.049%. Q2/Q1 was 0.76. The spinnability and the amount of fumes of the resulting polymer are shown in Table 1 below.

Example 4

A crystalline polypropylene resin having an MFR of 23.8 g/10 min and Mw/Mn (Q1) of 3.23 was prepared in the same manner as in Example 1.

The resulting crystalline polypropylene resin was mixed with 0.015% of 2,5-dimethyl-2,5-di(t-butylperoxy)hexane and various antioxidants, and the mixture was melt-kneaded in a single screw extruder at a cylinder temperature of 250°

C. to prepare a polypropylene molding material having an MFR of 46.7 g/10 min. The polypropylene molding material was found to have Mw/Mn (Q2) of 2.68 and a $C_{20-70}$ hydrocarbon content of 0.038%. Q2/Q1 was 0.83. The spinnability and the amount of fumes of the resulting polymer are shown in Table 1 below.

Example 5

A crystalline polypropylene resin having an MFR of 18.6 g/10 min and Mw/Mn (Q1) of 2.98 was prepared in the same manner as in Example 1, except for changing the hydrogen feed to 5.3 NL.

The resulting crystalline polypropylene resin was mixed with 0.022% of 2,5-dimethyl-2,5-di(t-butylperoxy)hexane and various antioxidants, and the mixture was melt-kneaded in a single screw extruder at a cylinder temperature of 250° C. to prepare a polypropylene molding material having an MFR of 63.2 g/10 min. The polypropylene molding material was found to have Mw/Mn (Q2) of 2.42 and a $C_{20-70}$ hydrocarbon content of 0.045%. Q2/Q1 was 0.81. The spinnability and the amount of fumes of the resulting polymer are shown in Table 1 below.

antioxidants, and the mixture was melt-kneaded in a single screw extruder at a cylinder temperature of 250° C. to prepare a polypropylene molding material having an MFR of 51.0 g/10 min. The polypropylene molding material was found to have Mw/Mn (Q2) of 2.85 and a $C_{20-70}$ hydrocarbon content of 0.066%. Q2/Q1 was 0.59. The spinnability and the amount of fumes of the resulting polymer are shown in Table 1 below.

Comparative Example 3

A crystalline polypropylene resin having an MFR of 32.5 g/10 min and Mw/Mn (Q1) of 2.23 which was prepared in accordance with Japanese Patent 2902784 using the catalyst described therein was mixed with various antioxidants, and the mixture was melt-kneaded in a single screw extruder at a cylinder temperature of 250° C. to prepare a polypropylene molding material having an MFR of 33.2 g/10 min. The polypropylene molding material was found to have Mw/Mn (Q2) of 2.18 and a $C_{20-70}$ hydrocarbon content of 0.013%. Q2/Q1 was 0.98. The spinnability and the amount of fumes of the resulting polymer are shown in Table 1 below.

TABLE 1

|  |  | Example No. | | | | | Comparative Example No. | | |
| --- | --- | --- | --- | --- | --- | --- | --- | --- | --- |
|  |  | 1 | 2 | 3 | 4 | 5 | 1 | 2 | 3 |
| Crystalline PP | MFR (g/10 min) | 34.5 | 20.5 | 48.5 | 23.8 | 18.6 | 50.3 | 5.3 | 32.5 |
|  | Mw/Mn (Q1) | 3.02 | 3.25 | 2.85 | 3.23 | 2.98 | 2.35 | 4.85 | 2.23 |
| Amount of Peroxide (wt %) |  | 0.011 | 0.006 | 0.045 | 0.015 | 0.022 | — | 0.102 | — |
| PP Molding | MFR (g/10 min) | 52.2 | 25.8 | 93.6 | 46.7 | 63.2 | 52.5 | 51.0 | 33.2 |
| Material | Mw/Mn (Q2) | 2.48 | 2.92 | 2.16 | 2.68 | 2.42 | 2.31 | 2.85 | 2.18 |
|  | Peroxide content (wt %) | 0.011 | 0.006 | 0.045 | 0.015 | 0.022 | — | 0.102 | — |
|  | $C_{20-70}$ Hydrocarbon Content (wt %) | 0.035 | 0.029 | 0.049 | 0.038 | 0.045 | 0.021 | 0.066 | 0.013 |
|  | $T_{50}$ (° C.) | 95 | 105 | 98 | 101 | 93 | 90 | 132 | 91 |
|  | σ | 7.5 | 5.6 | 8.2 | 6.8 | 8.5 | 6.4 | 10.8 | 7.6 |
|  | Q2/Q1 | 0.82 | 0.90 | 0.76 | 0.83 | 0.81 | 0.98 | 0.59 | 0.98 |
| Amount of Fumes |  | 75 | 60 | 120 | 90 | 100 | 50 | 160 | 60 |
| Spinnability (Number of filament breaks/30 min) |  | 5 | 13 | 5 | 6 | 7 | 29 | 6 | 26 |

Crystalline PP = Crystalline polypropylene resin

Comparative Example 1

A crystalline polypropylene resin having an MFR of 50.3 g/10 min and Mw/Mn (Q1) of 2.35 was prepared in the same manner as in Example 1, except for changing the hydrogen feed to 8.2 NL.

The resulting crystalline polypropylene resin was mixed with various antioxidants, and the mixture was melt-kneaded in a single screw extruder at a cylinder temperature of 250° C. to prepare a polypropylene molding material having an MFR of 52.5 g/10 min. The polypropylene molding material was found to have Mw/Mn (Q2) of 2.31 and a $C_{20-70}$ hydrocarbon content of 0.021%. Q2/Q1 was 0.98. The spinnability and the amount of fumes of the resulting polymer are shown in Table 1 below.

Comparative Example 2

A crystalline polypropylene resin having an MFR of 5.3 g/10 min and Mw/Mn (Q1) of 4.85 which was prepared by using a Zieglar catalyst was mixed with 0.102% of 2,5-dimethyl-2,5-di(t-butylperoxy)hexane and various As can be seen from the results in Table 1, the polypropylene molding materials of Comparative Example 1 and 3 which were prepared without reaction with a peroxide undergo breaking due to the trace amounts of high-molecular components, and the spun filaments frequently break in high-speed spinning. The molding material of Comparative Example 2 which was prepared by CR treatment with a large amount of a peroxide contains low-molecular fragments in an increased proportion and emitted an increased amount of fumes on molding. To the contrary, the polypropylene molding materials according to the invention exhibited excellent spinnability with reduced filament breaks and gave off a reduced amount of fumes on molding.

The polypropylene molding material of the invention is obtained by subjecting a crystalline polypropylene resin having a specific composition distribution, exemplified by polypropylene prepared by using a metallocene catalyst system, to CR treatment with a reduced amount of a peroxide. Since the CR treatment aims at decomposing trace amounts of high-molecular components in the crystalline polypropylene resin which cause filament breaks, the amount of the peroxide to be used is as small as is consistent with the purpose. Therefore, fuming that is caused by the peroxide treatment can be suppressed. As a result, there is obtained a molding material which has excellent spinnability in high-speed spinning with reduced fuming and therefore provides nonwoven fabric and the like with high productivity.

What is claimed is:

1. A polypropylene molding material obtained by the reaction of a crystalline polypropylene resin and a peroxide, said polypropylene molding material having (A) a melt flow rate of 20 to 100 g/10 min and a weight average molecular weight to number average molecular weight ratio of 1.5 to 3.5 as measured by gel-permeation chromatography, (B) a content of hydrocarbons having 20 to 70 carbon atoms of 0.05% by weight or less, (C) a mean elution temperature ($T_{50}$) of 75 to 120° C. and a degree of variation of elution ($\sigma$) of 9 or smaller, and (D) a Q2/Q1 ratio of 0.75 to 0.95, wherein Q1 is a weight average molecular weight to number average molecular weight ratio of said crystalline polypropylene resin as measured by gel-permeation chromatography, and Q2 is a weight average molecular weight to number average molecular weight ratio of said propylene molding material as measured by gel-permeation chromatography.

2. A polypropylene molding material according to claim 1, wherein said reaction is carried out by adding 0.005 to 0.05% by weight, based on said crystalline polypropylene resin, of the peroxide to said crystalline polypropylene resin.

3. A polypropylene molding material according to claim 1, wherein said reaction is carried out by adding 0.005 to 0.05% by weight, based on said crystalline polypropylene resin, of the peroxide to said crystalline polypropylene resin and melt-kneading the mixture at 180 to 280° C.

4. A polypropylene molding material according to claim 2, wherein said reaction is carried out by adding 0.005 to 0.05% by weight, based on said crystalline polypropylene resin, of the peroxide to said crystalline polypropylene resin and melt-kneading the mixture at 180 to 280° C.

5. A polypropylene molding material according to claim 1, wherein said crystalline polypropylene resin is a resin obtained by using a catalyst system comprising (A) a metallocene compound represented by formula (I):

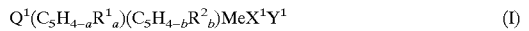

$$Q^1(C_5H_{4-a}R^1{}_a)(C_5H_{4-b}R^2{}_b)MeX^1Y^1 \qquad (I)$$

wherein $(C_5H_{4-a}R^1{}_a)$ and $(C_5H_{4-b}R^2{}_b)$ are each a conjugated 5-membered cyclic ligand; $Q^1$ represents a linking group bridging the two conjugated 5-membered cyclic ligands, which is selected from a divalent hydrocarbon group having 1 to 20 carbon atoms, a silylene group having a hydrocarbon group having 1 to 20 carbon atoms, and a germylene group having a hydrocarbon group having 1 to 20 carbon atoms; Me represents zirconium or hafnium; $X^1$ and $Y^1$ each independently represent a hydrogen atom, a halogen atom, a hydrocarbon group having 1 to 20 carbon atoms, an alkoxy group having 1 to 20 carbon atoms, an alkylamido group having 1 to 20 carbon atoms, a trifluoromethane-sulfonic acid group, a phosphorus-containing hydrocarbon group having 1 to 20 carbon atoms or a silicon-containing hydrocarbon group having 1 to 20 carbon atoms; $R^1$ and $R^2$ each independently represent a hydrocarbon group having 1 to 30 carbon atoms, a halogen atom, an alkoxy group, a silicon-containing hydrocarbon group, a phosphorus-containing hydrocarbon group, a nitrogen-containing hydrocarbon group or a boron-containing hydrocarbon group; a and b each represent an integer of 0 to 4; where a or b is 2 or more, two adjacent $R^1$'s or $R^2$'s may be taken together to form a ring; and the two 5-membered cyclic ligands are asymmetrical with respect to a plane containing Me when viewed as to the relative positions thereof through the linking group $Q^1$, (B) an ion exchangeable layer compound except a silicate or an inorganic silicate, and (C) an organoaluminum compound.

6. A polypropylene molding material according to claim 2, wherein said crystalline polypropylene resin is a resin obtained by using a catalyst system comprising (A) a metallocene compound represented by formula (I):

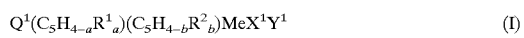

$$Q^1(C_5H_{4-a}R^1{}_a)(C_5H_{4-b}R^2{}_b)MeX^1Y^1 \qquad (I)$$

wherein $(C_5H_{4-a}R^1{}_a)$ and $(C_5H_{4-b}R^2{}_b)$ are each a conjugated 5-membered cyclic ligand; $Q^1$ represents a linking group bridging the two conjugated 5-membered cyclic ligands, which is selected from a divalent hydrocarbon group having 1 to 20 carbon atoms, a silylene group having a hydrocarbon group having 1 to 20 carbon atoms, and a germylene group having a hydrocarbon group having 1 to 20 carbon atoms; Me represents zirconium or hafnium; $X^1$ and $Y^1$ each independently represent a hydrogen atom, a halogen atom, a hydrocarbon group having 1 to 20 carbon atoms, an alkoxy group having 1 to 20 carbon atoms, an alkylamido group having 1 to 20 carbon atoms, a trifluoromethane-sulfonic acid group, a phosphorus-containing hydrocarbon group having 1 to 20 carbon atoms or a silicon-containing hydrocarbon group having 1 to 20 carbon atoms; $R^1$ and $R^2$ each independently represent a hydrocarbon group having 1 to 30 carbon atoms, a halogen atom, an alkoxy group, a silicon-containing hydrocarbon group, a phosphorus-containing hydrocarbon group, a nitrogen-containing hydrocarbon group or a boron-containing hydrocarbon group; a and b each represent an integer of 0 to 4; where a or b is 2 or more, two adjacent $R^1$'s or $R^2$'s may be taken together to form a ring; and the two 5-membered cyclic ligands are asymmetrical with respect to a plane containing Me when viewed as to the relative positions thereof through the linking group $Q^1$, (B) an ion exchangeable layer compound except a silicate or an inorganic silicate, and (C) an organoaluminum compound.

7. A polypropylene molding material according to claim 3, wherein said crystalline polypropylene resin is a resin obtained by using a catalyst system comprising (A) a metallocene compound represented by formula (I):

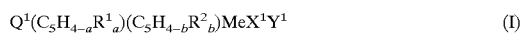

$$Q^1(C_5H_{4-a}R^1{}_a)(C_5H_{4-b}R^2{}_b)MeX^1Y^1 \qquad (I)$$

wherein $(C_5H_{4-a}R^1{}_a)$ and $(C_5H_{4-b}R^2{}_b)$ are each a conjugated 5-membered cyclic ligand; $Q^1$ represents a linking group bridging the two conjugated 5-membered cyclic ligands, which is selected from a divalent hydrocarbon group having 1 to 20 carbon atoms, a silylene group having a hydrocarbon group having 1 to 20 carbon atoms, and a germylene group having a hydrocarbon group having 1 to 20 carbon atoms; Me represents zirconium or hafnium; $X^1$ and $Y^1$ each independently represent a hydrogen atom, a halogen atom, a hydrocarbon group having 1 to 20 carbon atoms, an alkoxy group having 1 to 20 carbon atoms, an alkylamido group having 1 to 20 carbon atoms, a trifluoromethane-sulfonic acid group, a phosphorus-containing hydrocarbon group having 1 to 20 carbon atoms or a silicon-containing hydrocarbon group having 1 to 20 carbon atoms; $R^1$ and $R^2$ each independently represent a hydrocarbon group having 1 to 30 carbon atoms, a halogen atom, an alkoxy group, a silicon-containing hydrocarbon group, a phosphorus-containing hydrocarbon group, a nitrogen-containing hydrocarbon group or a boron-containing hydrocarbon group; a and b each represent an integer of 0 to 4; where a or b is 2 or more, two adjacent $R^1$'s or $R^2$'s maybe taken together to form a ring; and the two 5-membered cyclic ligands are asymmetrical with respect to a plane containing Me when viewed as to the relative positions thereof through the linking group $Q^1$, (B) an ion exchangeable layer compound except a silicate or an inorganic silicate, and (C) an organoaluminum compound.

8. A polypropylene molding material according to claim 1, which is for spinning.

9. A polypropylene molding material according to claim 2, which is for spinning.

10. A polypropylene molding material according to claim 3, which is for spinning.

* * * * *